(No Model.)
J. W. BRAGGER.
AUTOMATIC ALCOHOL INJECTOR FOR SERVICE PIPES.
No. 466,998. Patented Jan. 12, 1892.
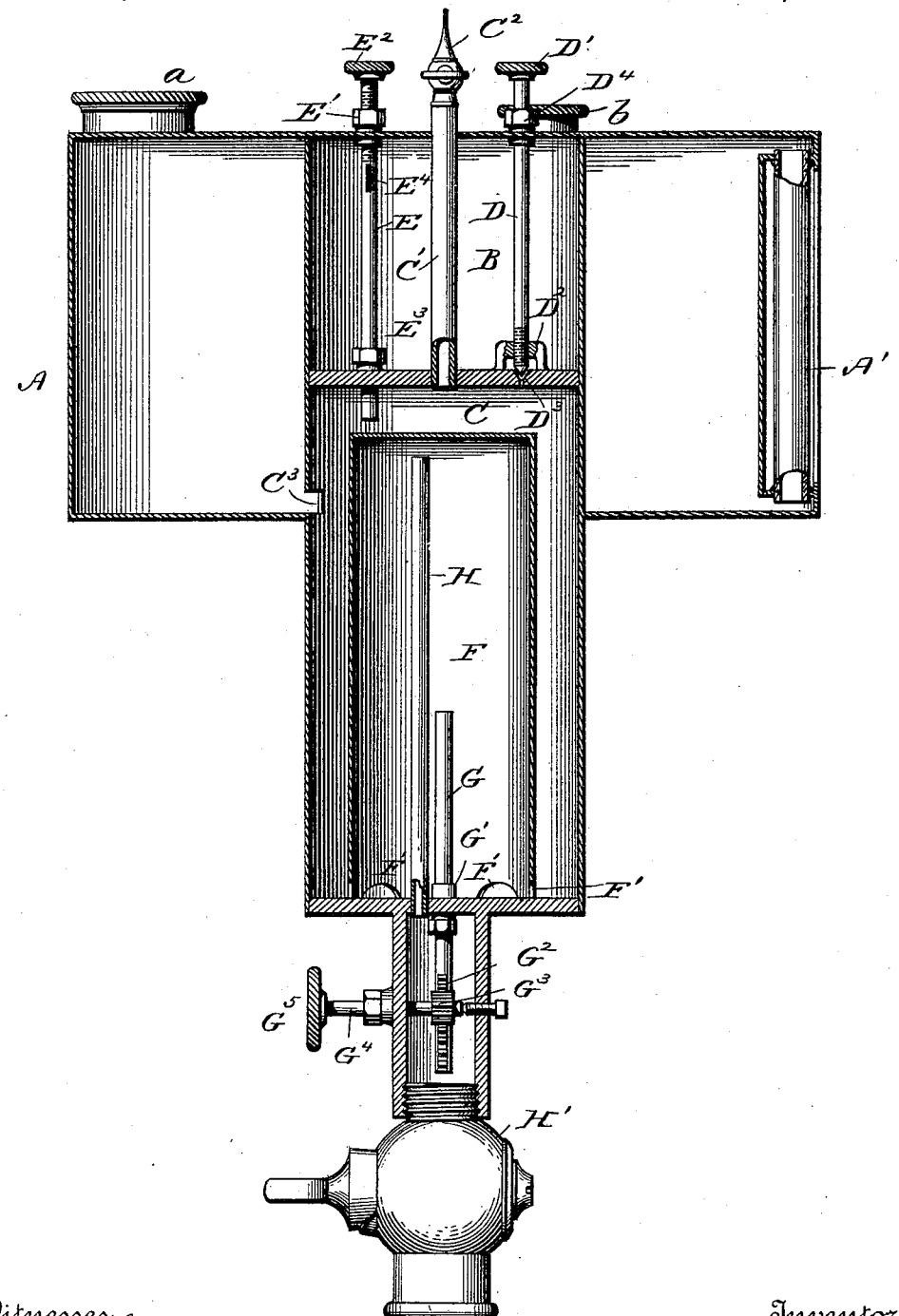

UNITED STATES PATENT OFFICE.

JOHN WILLIAM BRAGGER, OF WATERTOWN, NEW YORK, ASSIGNOR OF TWO-THIRDS TO JAMES B. WISE AND WALTER E. BRAGGER, OF SAME PLACE.

AUTOMATIC ALCOHOL-INJECTOR FOR SERVICE-PIPES.

SPECIFICATION forming part of Letters Patent No. 466,998, dated January 12, 1892.

Application filed February 18, 1891. Serial No. 381,928. (No model.)

*To all whom it may concern:*

Be it known that I, JOHN WILLIAM BRAGGER, a citizen of the United States, residing at Watertown, in the county of Jefferson and State of New York, have invented certain new and useful Improvements in Automatic Alcohol-Injectors for Service-Pipes; and I do declare the following to be a full, clear, and exact description of the invention, such as will enable others skilled in the art to which it appertains to make and use the same, reference being had to the accompanying drawing, and to the letters of reference marked thereon, which forms a part of this specification.

This invention relates to certain new and useful improvements in injectors; and it has for its object to provide a simple and efficient device of the character named which will be especially adapted for use for injecting alcohol into gas-service pipes for the purpose of removing frost and naphthaline that collect within the pipes as the result of condensation during cold weather.

To these ends and to such others as the invention may pertain the same consists in the peculiar construction and in the novel combination, arrangement, and adaptation of parts, all as more fully hereinafter described, shown in the accompanying drawings, and then particularly defined in the appended claims.

The invention is clearly illustrated in the accompanying drawing, which, with the letters of reference marked thereon, forms a part of this specification, and in which I have shown a central vertical section through an automatic alcohol-injector embodying my invention.

Reference now being had to the details of the invention by letter, A designates a suitable air and water tight chamber, which is provided with a filling-aperture $a$, which is closed by a suitable screw-threaded cap, as shown. The said chamber A is provided with a gage-pipe A', which serves at all times to indicate the height of liquid within the chamber, as will be readily understood.

B is a chamber, which is inclosed within the chamber A and is provided with a filling-aperture $b$, similar in all respects to the filling-aperture $a$ of the chamber A. Directly beneath the chamber B is located a chamber C, and communicating with the chamber C is an outlet-pipe C', which passes vertically through the chamber B and is provided at its upper end with a petcock $C^2$.

D is a valve stem or rod, which is passed vertically through the chamber B, being provided with an operating-wheel D' at its upper end and having its screw-threaded lower end seated within the screw-threaded socket $D^2$, while the extreme lower end of the rod is fashioned so as to adapt it to fit closely within the conical valve-seat $D^3$, which communicates with the chamber C. At the point at which the rod D passes through the upper wall of the chamber B a suitable stuffing-box $D^4$ is provided to render the same air-tight.

E is a hollow tube or pipe, which is passed vertically through the chamber B, the upper portion of the pipe being externally screw-threaded to adapt it to engage the screw-threaded bearing E', through which it passes, and the upper end of the pipe is provided with an operating-wheel $E^2$. The lower end of said pipe E is passed through the stuffing-box $E^3$ and is extended into the compartment C and is open at its lower end. Near its upper end the pipe E is provided with openings or perforations $E^4$ for a purpose which will presently appear. The compartment C is provided at a point near its upper end with an opening $C^3$, which communicates with the chamber A.

F is a chamber which is inclosed within the chamber C and extends from the bottom of said chamber C to a point near its upper end, being provided at its lower edge with openings F', through which communication is had between the said chambers.

G is a pipe, open at its upper end, which is passed vertically through the bottom of the chamber F, (a suitable stuffing-box G' being provided,) and the lower portion of the pipe being provided with a suitable rack-bar $G^2$, with which the pinion $G^3$ upon the transverse shaft $G^4$ meshes, said shaft being provided with an operating-wheel $G^5$, by means of which the shaft may be rotated to adjust the position of the pipe G within the chamber F, as will be readily understood.

H is a vertical pipe, open at its upper end, said pipe extending vertically from the valve H' to a point near the upper end of the chamber F, and is adapted, when the valve is opened, to admit air to the upper portion of said chamber.

In operating the device the valve H' and the petcock $C^2$ are closed, and the chambers A and B are filled with alcohol through the filling-apertures $a$ and $b$, respectively, after which the said filling-apertures are securely closed. The alcohol in entering the tank or compartment A passes through the opening $C^3$ into the tank or compartment C, thence through the openings F' it enters the inner chamber F, where it will continue to rise within the chamber until its progress is interrupted by the air or gas which may be confined within the upper part of said chamber. It will then rise in the compartment or chamber C until it has passed the inlet-opening $C^3$, when the air or gas in the upper part of the chamber C will prevent its further rise. The rise in the tank or chamber A will then continue until the said chamber has been practically filled.

When the cock H' and the petcock $C^2$ are opened, the pressure of gas enters through the air-inlet tube H and serves to force the alcohol within the chamber F, which will be near the top of the overflow-pipe G, down in the chamber F and cause it to enter the chamber C, forcing the air from the upper portion of said chamber out through the outlet-pipe C', the injector now standing with a normal pressure of gas upon it. When either frost or naphthaline has collected within the sub-service-pipe, the pressure within the pipe between the point at which the obstruction exists and the point at which the injector is to be applied must first be reduced, which will allow the alcohol within the chamber F to rise, and when the pressure has been sufficiently reduced the alcohol will rise within the chamber to above the top of the overflow-pipe G (which pipe may be adjusted so as to adapt it to any desired degree of pressure by turning the wheel $G^2$, as will be readily understood) and passing through the said pipe G and its connections into the service-pipe. When the alcohol within the chamber F has arisen to the top of the overflow-pipe G, it will fall within the chamber C until it exposes the top of the opening $C^3$, when the alcohol within the compartment A will flow through said opening, and as the alcohol disappears from said tank A its place will be taken by air, which enters through the pipe C'. When sufficient alcohol has been passed through the injector to serve the purpose of cutting the frost or naphthaline from the service-pipe, the pressure within the pipe will be raised to its normal point, and, passing through the pipe H, will serve to force the alcohol within the chamber F down, causing it to rise in the compartment C until it closes the opening $C^3$, when the injection will stop until it is again required.

The compartment B is intended as an auxiliary alcohol-reservoir from which the supply within the tank C may be replenished when the same becomes lessened by evaporation or other causes. In use when the injector stands at a normal pressure the air-tube E is forced down by turning the operating-wheel $E^2$ until the lower end of the pipe reaches the surface of the alcohol in the compartment C, when the valve $D^3$ is opened slightly, so as to allow the alcohol to drip slowly into the tank C. When sufficient alcohol has evaporated from the compartment C to expose the openings in the lower end of the tube E, air passes from the compartment C, which is supplied through the air-tube C', and passing upward through said tube E and through the openings $E^4$ in the upper portion of said pipe it enters the upper portion of the tank B. The alcohol will continue to drip through the valve $D^3$ into the compartment C until the open lower end of the air-tube E is closed by the rise of alcohol within said compartment.

In using the term "automatic regulator" I desire to be understood as referring to the valve and pipe connections between the receiving-tank, the chambers connected therewith, and the service-pipe, whereby the flow of alcohol to the service-pipe is automatically regulated.

What I claim as new is—

1. A device for the purpose stated, having a receiving-tank, means for attachment to the pipe or main, and an automatic regulator, substantially as specified.

2. A device for the purpose stated, consisting of a receiving-tank, a chamber or tank communicating therewith, regulating means within the last-mentioned tank, and a secondary receiving-tank with regulating means, as set forth.

3. A device for the purpose stated, consisting of a main receiving-tank, a tank or chamber having communication therewith, a secondary receiving-tank independent of the main tank, and an air-pipe extending through the secondary tank into the intermediate one, as set forth.

4. A device for the purpose stated, consisting of a main receiving-tank, a secondary receiving-tank, a chamber or tank having communication with both said tanks, an adjustable pipe G, and an inlet-pipe H with its upper end on a higher level than that of the pipe G, substantially as and for the purpose specified.

5. A device for the purpose stated, consisting of a main receiving-tank, a secondary receiving-tank, a chamber or tank C, having communication with the main tank, the chamber inclosed within the chamber C, and the inlet and outlet pipes in the inner chamber, as set forth.

6. The combination, with the main tank and the chamber or tank C, having communication therewith, of the chamber inclosed by the chamber C and having communication therewith at the bottom only, the inlet and outlet pipes in the inner chamber, one extended above the other, and means for regulating the outlet-pipe vertically, as set forth.

7. The combination, with the main tank, the chamber having communication therewith, and the chamber within the said chamber, of the secondary tank, the adjustable valve therein, the air-pipe and its cock, and the pipe E, all substantially as specified.

8. The combination, with the main tank, the chamber communicating therewith, the chamber inclosed therein, and the outlet and inlet pipes extended into the inner chamber, of the secondary tank, its air-pipe, adjustable valve, and the pipe E, extending into the middle chamber and made adjustable, substantially as and for the purpose specified.

In testimony whereof I affix my signature in presence of two witnesses.

JOHN WILLIAM BRAGGER.

Witnesses:
GEORGE S. HOOKER,
THOMAS AMBROSE.